US009529685B2

(12) United States Patent
Barthel et al.

(10) Patent No.: US 9,529,685 B2
(45) Date of Patent: Dec. 27, 2016

(54) METHOD FOR CHECKING AN INSTALLATION LOCATION OF A COMPONENT AND AUTOMATION COMPONENT

(75) Inventors: Herbert Barthel, Herzogenaurach (DE); Temple L. Fulton, Elizabethton, TN (US); Peter Hoedl, Graz (AT)

(73) Assignee: Siemens Aktiengesellschaft, Munich (DE)

(*) Notice: Subject to any disclaimer, the term of this patent is extended or adjusted under 35 U.S.C. 154(b) by 452 days.

(21) Appl. No.: 13/822,978

(22) PCT Filed: Jun. 28, 2011

(86) PCT No.: PCT/US2011/042113
§ 371 (c)(1),
(2), (4) Date: Mar. 13, 2013

(87) PCT Pub. No.: WO2013/002763
PCT Pub. Date: Jan. 3, 2013

(65) Prior Publication Data
US 2013/0173960 A1     Jul. 4, 2013

(51) Int. Cl.
*G06F 11/273* (2006.01)
*H04L 12/26* (2006.01)
(Continued)

(52) U.S. Cl.
CPC ......... *G06F 11/273* (2013.01); *H04L 12/2697* (2013.01); *H04L 41/12* (2013.01);
(Continued)

(58) Field of Classification Search
CPC .... G06F 11/273; H04L 12/2697; H04L 41/12; H04L 43/0852; H04L 43/50; H04L 61/2038
See application file for complete search history.

(56) References Cited

U.S. PATENT DOCUMENTS 5,802,106 A * 9/1998 Packer ........................... 375/225
6,732,165 B1 * 5/2004 Jennings, III ................. 709/220
(Continued)

FOREIGN PATENT DOCUMENTS

CN     101296201     10/2008
CN     101355482     1/2009
(Continued)

OTHER PUBLICATIONS

Doug, Testing Speed Tests, May 14, 2010, OOKLA, http://blog.ookla.com/2010/05/10/why-take-a-speed-test/.*
(Continued)

*Primary Examiner* — Fan Ng
*Assistant Examiner* — Rodrick Mak
(74) *Attorney, Agent, or Firm* — Cozen O'Connor

(57) ABSTRACT

A method for checking an installation location of a component in a failsafe automation system, wherein the components are connected to one another in series and uniquely defined addresses are continuously assigned from a first component to successor components, wherein, after the assignment of addresses to the components, a switching device is operated in the components such that a signal transit time measurement is performed incrementally with a test signal for each successor component, and wherein the test signal is emitted and re-received and the installation location of the successor component is check based on the time difference.

9 Claims, 4 Drawing Sheets

(51) Int. Cl.
  *H04L 12/24*  (2006.01)
  *H04L 29/12*  (2006.01)

(52) U.S. Cl.
  CPC .......... *H04L 43/0852* (2013.01); *H04L 43/50* (2013.01); *H04L 61/2038* (2013.01)

(56) References Cited

U.S. PATENT DOCUMENTS

| | | | |
|---|---|---|---|
| 8,904,092 B2* | 12/2014 | Tucek | G06F 12/0238 711/103 |
| 2002/0087666 A1 | 7/2002 | Huffman et al. | |
| 2003/0072185 A1* | 4/2003 | Lane et al. | 365/189.02 |
| 2005/0135257 A1 | 6/2005 | Stephens et al. | |
| 2006/0274760 A1* | 12/2006 | Loher | 370/395.52 |
| 2010/0052694 A1* | 3/2010 | Itoh | 324/537 |
| 2011/0029398 A1* | 2/2011 | Boudville | G06F 17/3087 705/26.1 |
| 2012/0221774 A1* | 8/2012 | Atkisson | G06F 12/0802 711/103 |

FOREIGN PATENT DOCUMENTS

| | | |
|---|---|---|
| DE | 10 2006 013 578 | 9/2007 |
| WO | WO 2006/032124 | 3/2006 |

OTHER PUBLICATIONS

OOKLA, Measuring and Understanding Broadband: Speed, Quality and Application, Jun. 8, 2010, pp. 4-6.*

* cited by examiner

METHOD FOR CHECKING AN INSTALLATION LOCATION OF A COMPONENT AND AUTOMATION COMPONENT

CROSS-REFERENCE TO RELATED APPLICATIONS

This is a U.S. national stage of application No. PCT/US2011/042113 filed 28 Jun. 2011.

BACKGROUND OF THE INVENTION

1. Field of the Invention

The invention relates, on the one hand, to a method for checking an installation location of a component in a failsafe automation system, wherein a plurality of components are connected to one another in series and uniquely defined addresses are continuously assigned from a first component to the successor components.

Furthermore, the invention relates to an automation component configured for operation in a safety-oriented automation system, further configured for checking an installation location in a failsafe automation system, configured to connect to further components in series.

The specified components can be considered to be automation components and can be used, for example, in safety-oriented systems for industrial process automation. In this context, a first component can be configured as an F central unit which communicates via a communication bus with further components which are configured as F I/O devices. For example a Profinet I/O system or a back plane bus of an automation device is considered as the communication bus. "F" means failsafe here. In this grouping of components or automation devices, all the faults in an address allocation, addressing with a very high degree of coverage, must be detected, and a safety-oriented reaction must be carried out when a fault is present. A uniquely defined address is to be understood here, for example, as an F address or else a geographic address or a 1:1 relationship with the geographic address. Examples of a geographic address are: plug-in location of an F module in the rack or the installation location of an F device in an automation system.

2. Description of the Related Art

The exchange of F modules or F devices is considered to be particularly critical. Before or during the exchange, a fault in a standard address allocation may be present. This must be detected since otherwise during the further operation of the safety-oriented system an F controller would react to incorrect inputs or outputs. For example, in a process automation system an "incorrect" drive or an "incorrect" press would operate and could therefore injure an operator who is present at the location because he is carrying out small repairs or maintenance work in this part of the system.

Possible addressing errors which can occur are as follows:

The address/addresses of the module/modules or components are shifted in such a way that they correspond again to the address of the next F module, which also happens to have the same assembly properties. Alternatively, a further fault scenario, an addressing mechanism, is operating incorrectly with the result that the F module signals with the address of another F module.

German patent DE 10 2006 013 578 B4 has already presented a method and a control and data transmission system for checking the installation location of a secure communication participant. In the method in said document, the positions/addresses of the bus users of a field bus result from the fact that the positions of the bus users are known from the sequence in which the bus users have been stored in configuration data records. A disadvantage of this method is, however, that when an F assembly is replaced, an operator control action, specifically a confirmation by an operator, has to occur at the installation location for each replaced assembly. An operator is therefore required to confirm that the respective secure participant is connected at the predetermined installation location.

SUMMARY OF THE INVENTION

It is therefore the object of the present invention to make available a method for checking an installation location of a component or assembly, which method makes it possible, when a component is replaced, in particular when an F module is replaced, to dispense with a programming device or operator control device or an operator or an operator with a programming device.

The object is achieved with a method according to the preamble of claim 1 in such a way that switching means are operated in the components in such a way that a signal transit time measurement is carried out incrementally with a test signal for each successor component, wherein the test signal is emitted and received again and the installation location of the successor component is checked on the basis of the time difference. The method according to the invention is based on the realization that there must be a 1:1 relationship between an assigned address and a physical position. A transit time can therefore be determined with a signal transit time measurement. The transit time can also be referred to as a round trip time.

Use is made of the fact that a test signal which is emitted by a component in the direction of a central unit passes through the central unit and returns again to the emitting component.

An expected round trip time from the component to the central unit and back again is either known or can be calculated.

The measured round trip time can be compared with the expected round trip time. It has proven advantageous for the signal transit time measurement that the test signal passes through transit time delay elements in the components, wherein this increases the accuracy of the measurement.

A further increase in the accuracy for the transit time measurement can be achieved by virtue of the fact that in preparation for the transit time measurement, a Baud rate for the communication is reduced to low values.

Furthermore, it is advantageous according to the method if the first component is connected directly to a second component, and further successor components are each connected to their predecessor components, and the following steps are carried out for the assignment of addresses:

a) the first component transmits a uniquely defined address to the second component, wherein the second component is operated in such a way that a communication to its successor component is interrupted, b) the second component transmits a signal to the first component, which signal informs the first component that a valid address has been assigned, c) the first component transmits a switching instruction to the second component, wherein the second component is subsequently operated in such a way that communication with its successor component is possible, d) the first component subsequently transmits a further uniquely defined address to the successor component, wherein this successor component is operated in such a way that communication to it successor component is interrupted, e) the procedure as in step b) is continued, wherein the second component mentioned in step b) is now the respective successor component from step d) and the first component proceeds with respect to the successor component as in step c), f) the steps e) and f) are repeated until no successor component is present, and the first component is informed of this by a timeout signal from the last component.

In a first embodiment according to the method, the first component carries out the signal transit time measurement and the switching means in the successor components are controlled in such a way that the incoming test signal in the successor component for which the signal transit time is to be determined is transmitted back to the first component. Since the emission time of the test signal is inevitably known to the first component and the test signal is transmitted back to the first component, the arrival time is also known to the first component, and the first component can determine a time difference using suitable microprocessor means, wherein this determined time difference is stored in a table for the corresponding successor component.

This signal transit time measurement which is carried out by the first component is then carried out separately for each individual successor component, and the table entries are accordingly supplemented.

In another alternative embodiment according to the method, the individual successor components each carry out the signal transit time measurement independently, and the switching means in the successor components are controlled in such a way that the test signal is transmitted from the respective successor component for which the signal transit time is to be determined, via the first component, and is fed back to the successor component for which the signal transit time is to be determined. The respective component can then determine its own signal transit time or round trip time with respect to a superordinate automation device, for example a CPU, and create a separate table entry for itself or directly carry out an address comparison.

In a further embodiment of the method relating to both previously described embodiments, a computational transit time with respect to the allocated address is determined for the respective component and is compared with the measured signal transit time, and in the event that a predefinable deviation is not exceeded, the installation location of the component with respect to its address is considered to be valid, and otherwise the installation location or the address allocation is considered to be invalid. With this evaluation of valid or invalid it is possible, in particular for failsafe automation components, to trigger a failsafe action which, for example in the case of an input/output assembly, immediately switches off the outputs or supplies them with safe error values.

In the case of an automation component configured for operation in a safety-oriented automation system, further configured for checking an installation location in a failsafe automation system, configured to connect to further components in series, the object which is mentioned at the beginning is achieved in that the automation component has a transit time delay element and a switching means which connects the transit time delay element into a signal path between a predecessor component and a successor component for a signal transit time measurement, in such a way that a test signal is emitted by means of a microprocessor and is received again, wherein the microprocessor is configured to check the installation location on the basis of the time difference between the emission and reception of the test signal. In this context, the switching means are advantageously configured as multiplexer switches and are configured to c01 meet a first signal path for the incoming test signal and a second signal path for the returning test signal.

In one embodiment of the automation component, the microprocessor is configured to control the switching means in such a way that a connection to a successor component is interrupted.

So that the automation component, in particular a failsafe automation component, can check itself, the microprocessor is configured to determine a computational transit time with respect to an allocating address and to compare said transit time with the measured signal transit time, and to consider the installation location of the component, with respect to its address, as valid in the event of a predefinable deviation not being exceeded, and otherwise to consider the installation location or the address allocation as invalid. In the automation component, a first transit time delay element is preferably arranged in a first signal path and a second transit time delay element is preferably arranged in a second signal path.

The transit time measurement can be carried out particularly well with a linear structure, also known to a person skilled in the art as a daisy chain. A number of hardware components which are connected to one another in series and are usually applied in what are referred to as bus systems in automation technology are referred to as a daisy chain.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment of the invention, in which drawings.

DETAILED DESCRIPTION OF THE PREFERRED EMBODIMENTS

Figure 1:
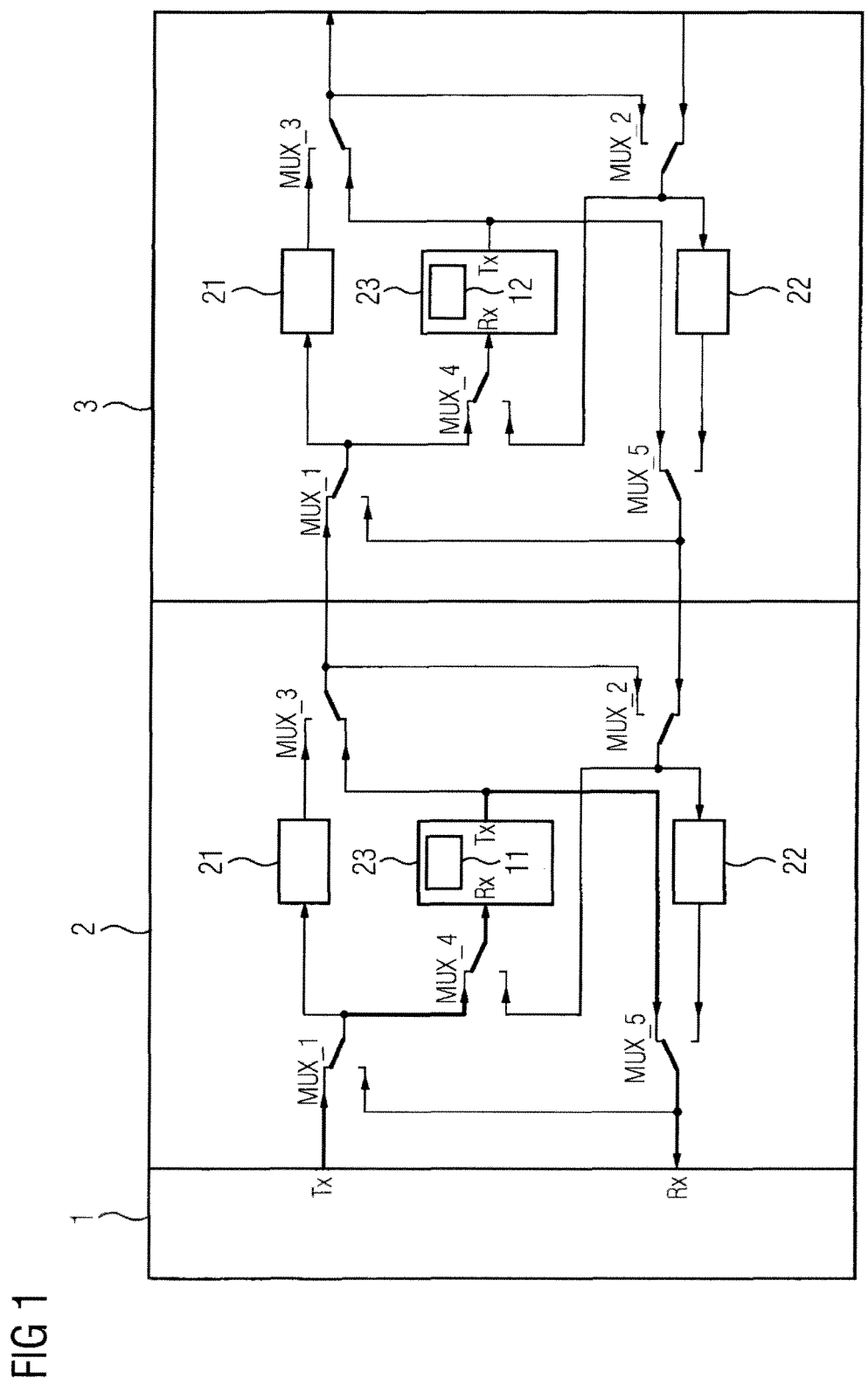
FIG. 1 shows three components connected in series for the address allocation in an initialization sequence.

According to FIG. 1, a first component 1, a second component 2, and a third component 3 are illustrated in a series connection. The components 1, 2, 3 are each designed to connect to further components in series. Physical plug-in locations of the components 1, 2, 3 could also be referred to as slot 1, slot 2, slot 3.

The first component 1 is accordingly plugged into slot 1 and is configured as an automation component in the form of a stored-program controller. This stored program controller has a Tx connection and an Rx connection with which it can connect to the second component 2, wherein the second component 2 can be configured, for example, as an I/O Profinet device, in particular as an input/output assembly. The second component 2 and the third component 3 are of identical design, with identical parts and functions being provided with identical reference symbols. The second component 2 has a first transit time delay element 21 and a second transit time delay element 22, wherein the transit time delay elements 21, 22 can be connected via switching means MUX_1 to MUX_5 into a signal path between the first component I and the third component 3 in such a way that a test signal can be emitted and received again by means of a microprocessor which is arranged in a communication controller 23. The procedure of the transit time measurement will be explained in more detail later with FIG. 2. FIG. 1 will firstly be used to clarify an address assignment of the individual components.

Since the series connection of the components 1, 2, 3 already constitutes an automation system 100 and said automation system 100 generally passes through an initialization sequence or has to be powered up again after a power failure, an address allocation of the individual components 1, 2, 3 is carried out as follows:

The first component I transmits a uniquely defined address, specifically a first address 11, to the second component 2, wherein the second component 2 is operated in such a way that communication to its successor component, that is to say the third component 3, is interrupted. The already mentioned switching means comprise a first switching means MUX_1, a second switching means MUX_2, a third switching means MDX_3, a fourth switching means MUX_4 and a fifth switching means MUX_5.

The first switching means MUX_1 is arranged at the Tx connection of the first component 1 in such a way that an emitted Tx signal can be conducted from the first component to the communication controller 23 via the fourth switching means MUX_4. The first transit time delay element 21 is also connected to the first switching means MUX_1, wherein said first transit time delay element 21 is arranged between the first switching means MUX_1 and the third switching means MUX_3 in such a way that it forms a type of longitudinal branch for a signal path which passes through to a successor component. However, for the case of address allocation, the third switching means MUX_3 is set in such a way that a connection to the successor component is interrupted.

The second transit time delay element 22 is also arranged between the fifth switching means MUX_5 and the second switching means MUX_2 in such a way that, in a specific switch position of the switching means MUX_5 and MUX_2, the second transit time delay element is also arranged in a longitudinal branch. However, since the switching means are controlled for the method step of the address allocation in such a way that the transit time delay elements 21, 22 cannot yet participate actively, for the address allocation just one signal path is possible from the Tx connection of the first component 1 via the first switching means MUX_1 to the fourth switching means MUX_4 and into the communication controller 23 which accepts a transmitted first address 11, and back to an Rx connection of the first component 1 via the fifth switching means MUX_5. If the second component 2 has received its first address 11 via the address allocation signal path described above, said component 2 communicates this to the first component 1 witJ1 a signal "valid address assigned". By means of this confirmation of the second component 2, the first component 1 transmits a switching instruction to the second component 2, wherein the second component 2 is subsequently operated with its switching means MUX_1, . . . , MUX_5 in such a way that communication with its successor component, that is to say the third component 3, is then possible.

The first component 1 subsequently transmits a further uniquely defined address, specifically a second address 12, to the third component 3, wherein this third component 3 is also operated in such a way that communication to Hs (possible) successor component is interrupted. The address allocation for the third component 3 is configured in an analogous fashion to the previously described address allocation method for the second component 2.

The second component 2 and the third component 3 then have uniquely defined addresses. Since the sequence of the address allocation is prescribed, the addresses are allocated in a rising sequence. For this reason, use can be made later of a relationship of the address allocation to the geographic position during the determination of the installation location.

Figure 2:
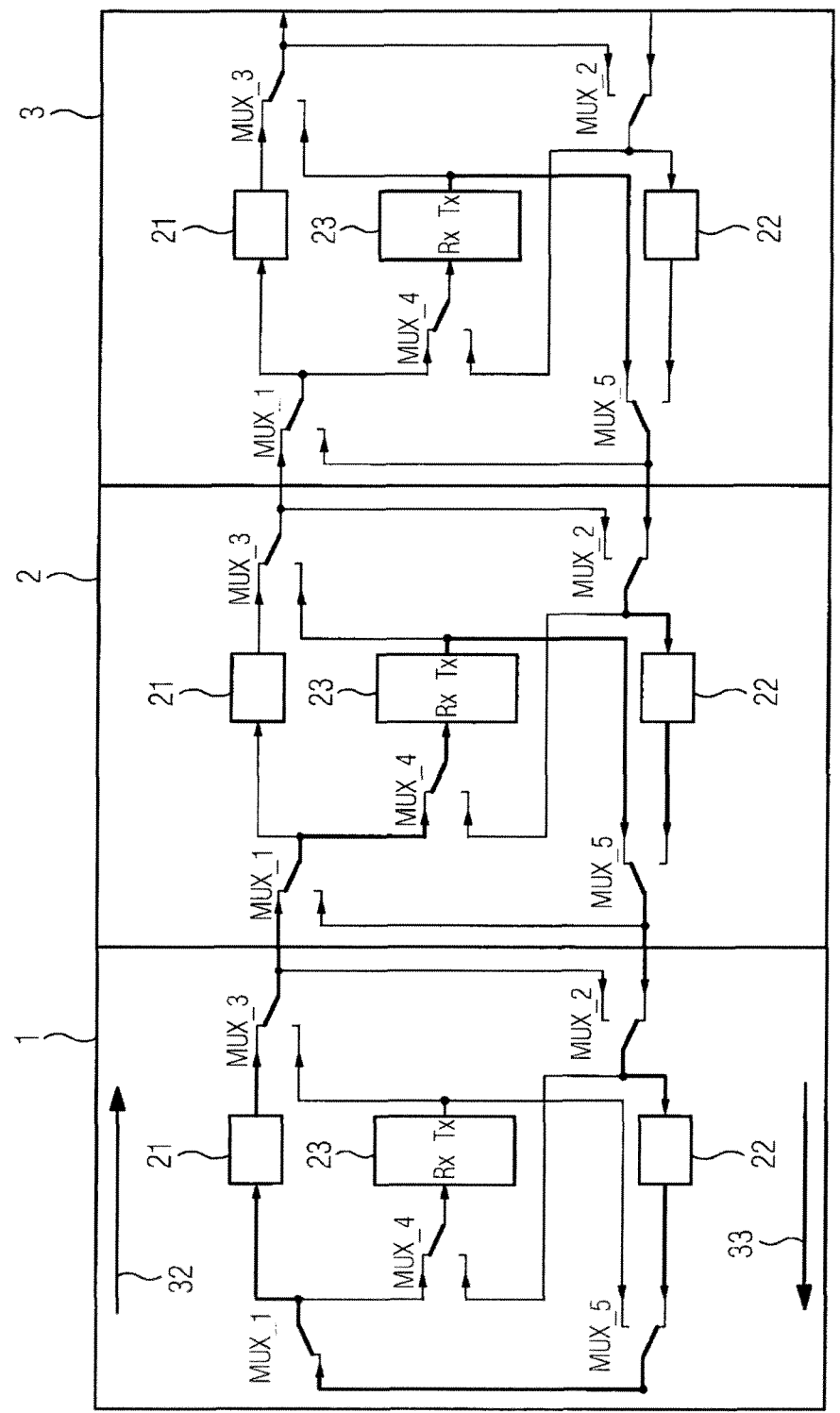
FIG. 2 shows three components for checking the addresses or transit time measurement.

FIG. 2 clarifies the transit time measurement which is carried out by the second component 2. For the signal transit time measurement which is carried out independently by the second component 2, a test signal is output to the fifth switching means MUX__5 in the second component 2 via the communication controller 23, wherein said switching means MUX_5 is set in such a way that the test signal can arrive at tl1e second transit time delay element 22 via a first signal path 31 into the first component 1. The transit time delay element 22 is preferably configured as an FIFO memory which imposes a defined delay time on the test signal. If the test signal leaves the FIFO memory after this defined delay time, said test signal can arrive at the first switching means MUX_1 in the first component 1 via the fifth switching means MUX_5 of the first component 1, and can pass through a second signal path 32, wherein the first switching means MUX_1 is set in such a way that the test signal arrives at tl1e first transit time delay element 21, and the later is also configured as an FIFO memory. If the test signal has also overcome this defined delay time, it passes back again to the second component 2 via the third switching means MUX_3, at which second component 2 it is conducted in turn to the communication controller 23 via the first switching means MUX_1 and the fourth switching means MUX_4. The second component 2 can detemline its installation location from the time difference between the emitted test signal and the test signal which is received again. To do this, said second component 2 compares the measured signal transit time with a computational transit time relating to its address. In this context, the microcontroller which is implemented in the communication controller 23 (see also FIG. 4) is configured in such a way that a predefinable deviation of the computational signal transit time from the measured signal transit time is observed and in the case of a deviation it is assumed that the allocated address does not correspond to the installation location or conversely the installation location does not correspond to the allocated address. Accordingly, it is possible, in particular in the case of a failsafe component, to trigger a function which increases the safety.

To summarize it can be stated that a secure automatic address allocation of an address relationship "F host to F module" which is sufficient for safety technology is achieved by virtue of the fact that, in addition to a "non-safety-oriented address allocation", the location of the F module is checked by means of a transit time measurement on the bus and the result is compared with the information of the "non-safety-oriented address allocation". Since this comparison and the measurement should also preferably be carried out again in a safety-oriented fashion, it is advantageous if the comparison and the measurement are carried out by the respective component which is to be embodied as an F module.

In an alternative embodiment, the non-safety-oriented address allocation could also be checked by means of two diverse mechanisms, specifically by a method based on a topology of a back plane bus and by using the aforementioned transit time measurement. Since each component is capable of interrupting the passing on to a subsequent component as well as of independently transmitting instructions to the nearest component, the component can create a list of its serial number by each component adding its own serial number data record to a list and passing this on to the next component. The list is transmitted by the last component in the chain to the first component, for example a CPU, which in turn makes available the entire list to each individual F module, that is to say to each individual component.

Each component (F module) can check it own physical position on the basis of this list and can furthermore also check the correct sequencing of the address allocation using additional included test information. In this variant, the transit time measurement of the test signal is, in contrast to the above-mentioned variant, carried out by the first component 1 here, for example a CPU, wherein the matter cannot be carried out by safety technology. These results are in turn evaluated and checked by the safety-oriented components, that is to say the components which are configured as F modules.

Figure 3:
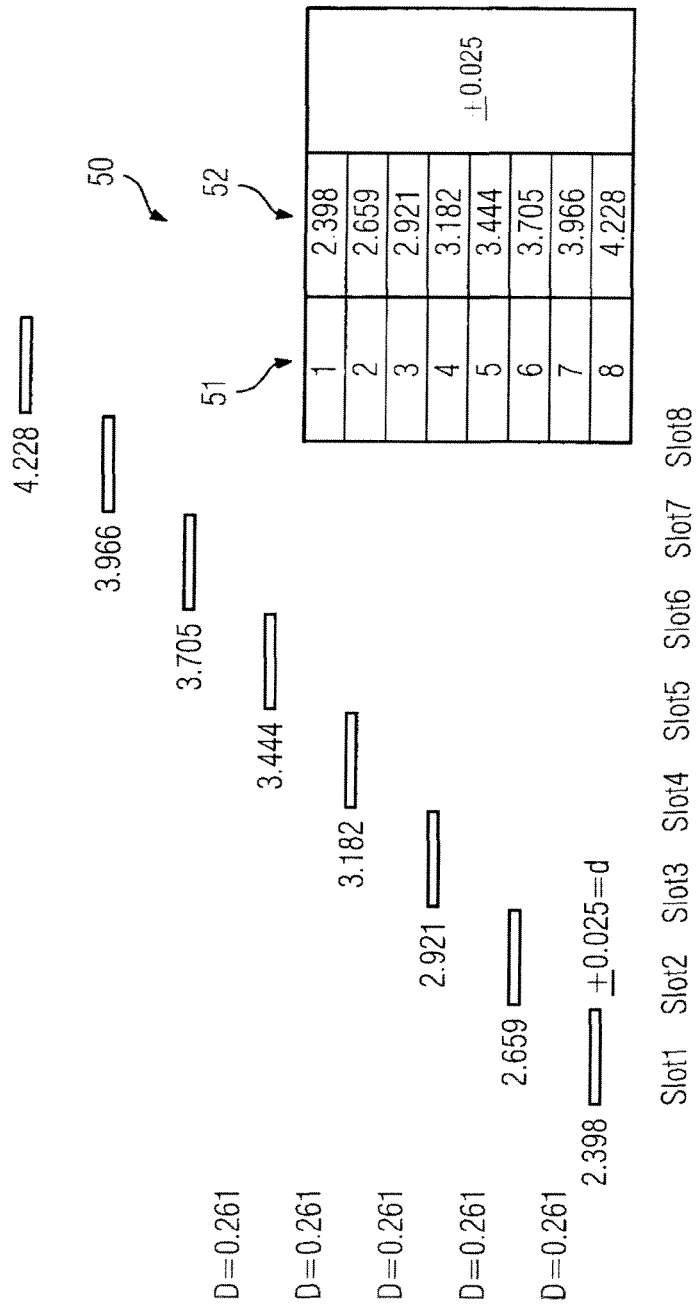
FIG. 3 shows a diagram of an expected transit time of the individual components, wherein the components are illustrated as slot 1 to slot 8.

Further advantages are: a black channel principle, known in, for example, Profi Save, on the back plane bus is not diluted. In the case of non-safety-oriented address allocation, a wide variety of undiscovered errors can occur in, for example, the firmware or in a RAM, with the result that incorrect addresses or slot numbers would be allocated. This is prevented by the diverse checking. In the second alternative of the method, only data or measured values are created, for example, by non-safety oriented system components, but their evaluation and the decision about the correctness of the address allocation process is a responsibility of the individual components which are embodied as F modules, that is to say are embodied by means of safety technology. FIG. 3 is a diagram of the expected signal transit times or round trip times. Addresses or slot numbers which correspond to the physical locations are illustrated on the X axis. For example, slots 1 to 8 are to be possible for a back plane bus. A respectively rising basic time D is represented on the Y axis. A deviation d of +/−0.025 ms must be complied with. In addition, the round trip time, the station addresses 1 to 8 and a tolerance, specifically the deviation d, are entered in a table 50. In this context, a first column 51 of the table 50 describes the station address or the slot 1 to slot 8, and a second column 52 describes the expected round trip time.

FIG. 3 therefore provides an illustration of the computationally determined signal transit time for the round trip times in the previously mentioned signal paths of the corresponding components, wherein the transit time delay is adapted by the use of corresponding transit time delay elements 21, 22 to correspondingly physically prevailing bus conditions such as, for example, intrinsic transit times of the signal lines.

Figure 4:
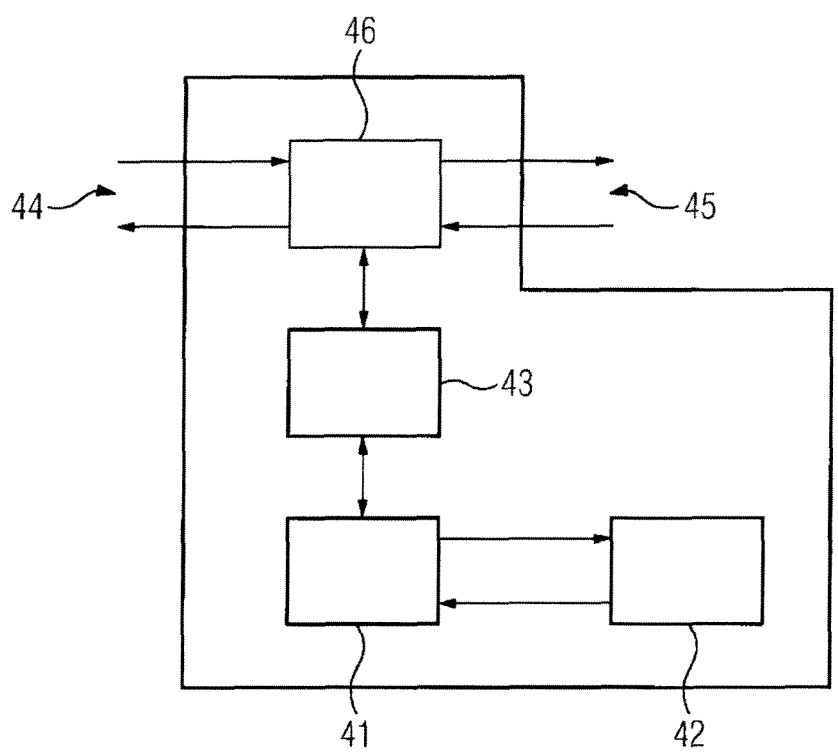
FIG. 4 shows a possible configuration variant of a component or of an automation component.

According to FIG. 4, a component is configured as an F module with a first bus connection 44 to predecessor components and a second bus connection 45 to successor components. A BUS-ASIC 46 is arranged between the two bus connections 44 and 45. The BUS-ASIC 46 is connected via a potential isolator 43 to a first microprocessor 41, and the first microprocessor 41 is connected in turn to a second microprocessor 42. The microprocessors 41, 42 can also be considered to be a first failsafe microprocessor and a second failsafe microprocessor.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for checking an installation location of a component in as failsafe automation system, comprising:
   connecting a plurality of components to one another in series;
   assigning, continuously, uniquely defined addresses from a first component of the plurality of components to successor components of the plurality of components, the first component being connected directly to a second component, and further successor components of the plurality of components each being connected to their predecessor components, said assigning the uniquely defined addresses comprising:
   a) transmitting, by the first component, a uniquely defined address to the second component of the plurality of components, the second component being operated such that a communication to its successor component is interrupted;
   b) transmitting, by the second component, a signal to the first component, the transmitted signal informing the first component that a valid address has been assigned;
   c) transmitting, by the first component, a switching instruction to the second component, the second component being subsequently operated such that communication with its successor component is possible;
   d) transmitting, by the first component, a further uniquely defined address to the successor component which is operated such that communication to its successor component is interrupted;
   e) continuing according to step b), the second component mentioned in step b) being the successor component from step d) and the first component proceeding with respect to the successor component according to step c); and
   f) repeating step e) until no successor component is present, and informing the first component that no successor component is present by a timeout signal from a last component successor; and
   operating a switching device of each of the successor components after the assignment of the addresses to the successor components such that a signal transit time measurement is performed incrementally with a test signal for each successor component, the test signal being emitted and re-received and an installation location of each of the successor components being checked based on the time difference;

wherein a computational transit time with respect to an allocated address is determined for the respective successor component and is compared with a measured signal transit time, and in an event (i) that a predefinable deviation is not exceeded, the installation location of the successor component with respect to its address is considered to be valid, and otherwise (ii) one of the installation location and the address allocation is considered to be invalid such that a failsafe action is triggered which immediately switches off outputs or supplies the successor component with safe error values when the installation location of the successor component with respect to its address is considered to be valid.

2. The method as claimed in claim 1, wherein the test signal passes through transit time delay elements in the components.

3. The method as claimed in claim 1, wherein, in preparation for the signal transit time measurement, a Baud rate for the communication is reduced to a lower value.

4. The method as claimed in claim 2, wherein, in preparation for the signal transit time measurement, a Baud rate for the communication is reduced to a lower value.

5. The method as claimed in claim 1, wherein the first component performs the signal transit time measurement and controls the switching device in the successor components such that an incoming test signal in the successor component for which the signal transit time is to be determined is transmitted back to the first component.

6. The method as claimed in claim 1, wherein individual successor components of the plurality of successor components each perform the signal transit time measurement independently, and the switching device in each of the successor components are controlled such that the test signal is transmitted from a successor component of the plurality of successor components for which the signal transit time is to be determined, via the first component, and is fed back to the successor component of the plurality of successor components for which the signal transit time is to be determined.

7. An automation component configured to operate in a safety-oriented automation system, and further configured to check an installation location in a failsafe automation system, and configured to connect to further components in series, the automation component comprising:
   a transit time delay element;
   a microprocessor; and
   a switch which connects the transit time delay element into a signal path between a predecessor component and a successor component for a signal transit time measurement, such that a test signal is emitted via the microprocessor and is re-received;
wherein the microprocessor is configured to check the installation location based on a time difference between emission and reception of the test signal;
wherein the microprocessor is configured to control the switch such that a connection to the successor component is interrupted; and
wherein the microprocessor is configured to determine a computational signal transit time with respect to an allocated address and to compare said signal transit time with a measured signal transmit time, and to (i) consider the installation location of the automation component with respect to its address as valid in an event of a predefinable deviation not being exceeded, and otherwise to (ii) consider one of the installation location and the address allocation as invalid such that a failsafe action is triggered which immediately switches off outputs or supplies the successor component with safe error values when the installation location of the successor component with respect to its address is considered to be valid.

8. The automation component as claimed in claim 7, wherein the switch is configured as a multiplexer and is configured to connect a first signal path for an incoming test signal and a second signal path for a returning test signal.

9. The automation component as claimed in claim 7, further comprising:
   a first transit time delay element arranged in a first signal path, and
   a second transit time delay element is arranged in a second signal path.

* * * * *